March 17, 1953  L. PETERS  2,631,939
PACKAGING OF SOFT PLASTIC FOODS
Filed May 2, 1952
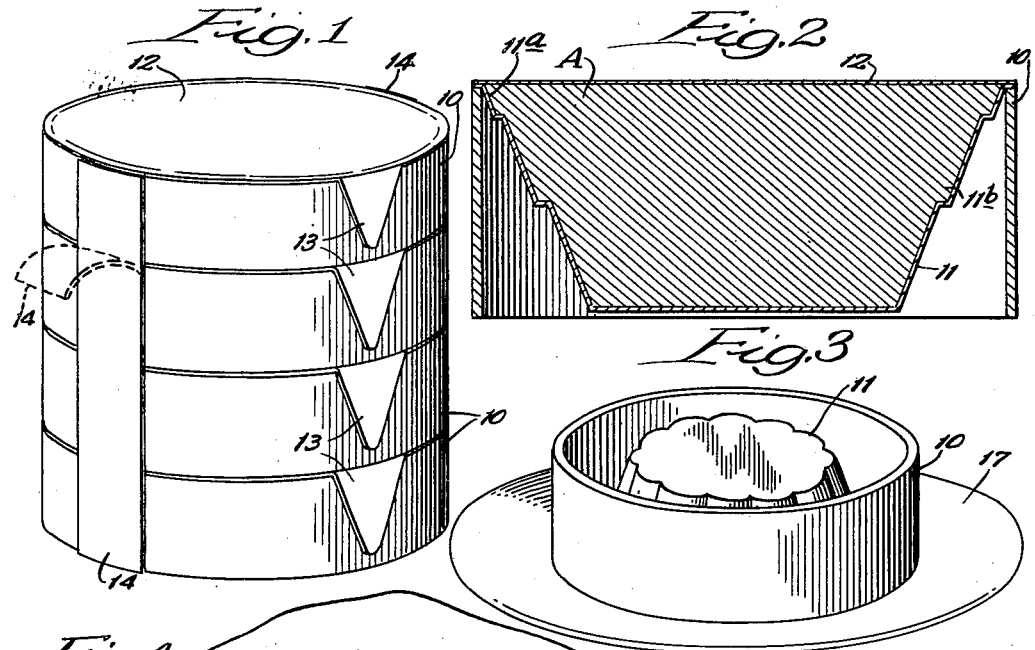
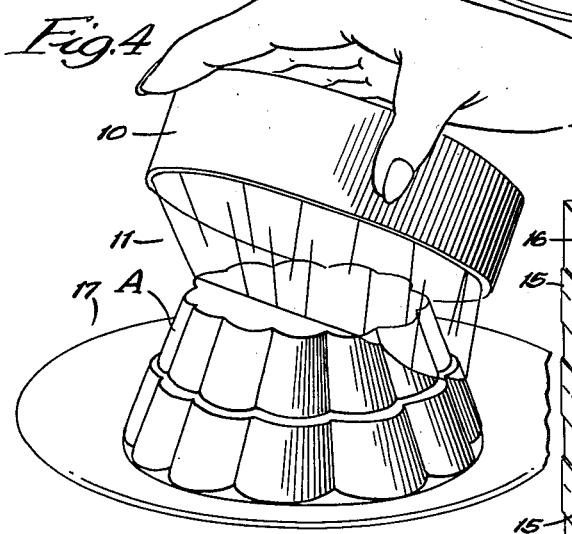
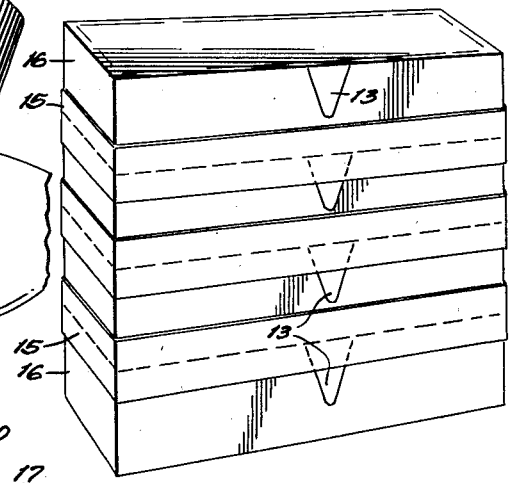
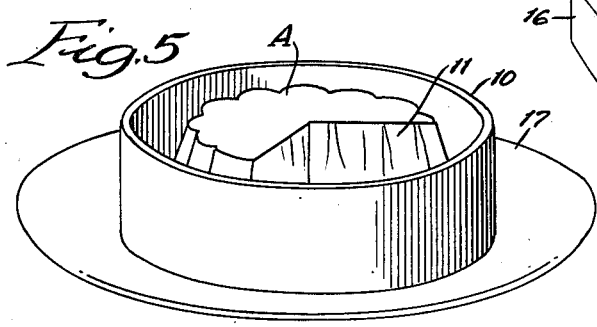
INVENTOR:
Leo Peters,
BY
Dawson & Ooms,
ATTORNEYS.

Patented Mar. 17, 1953

2,631,939

UNITED STATES PATENT OFFICE 2,631,939

PACKAGING OF SOFT PLASTIC FOODS

Leo Peters, Evanston, Ill.

Application May 2, 1952, Serial No. 285,647

25 Claims. (Cl. 99—171)

This invention relates to the packaging of soft plastic foods. More particularly, this invention relates to a soft plastic food package, and method of molding, carrying, and dispensing soft plastic foods. The package and method of this invention have particular utility in connection with the packaging of soft plastic foods in surface-ornamented shapes.

This application is a continuation-in-part of my co-pending application United States Serial No. 178,225, filed August 8, 1950. This application is also a continuation-in-part of my co-pending application United States Serial No. 161,082, filed May 10, 1950.

The type of foods with which this invention is primarily concerned can best be described as "soft plastic foods," and therefore this designation will be employed in the following specification and claims. By way of specific illustration, the term "soft plastic foods" as used herein is intended to include such foods as butter, margarine, ice cream, sherbet, processed cheese and cheese foods, jellies and gelatins, puddings, meat spreads, and other foods of similar physical properties. Characteristic of such foods is a body which while firm enough to be shape-maintaining at temperatures of normal use is at the same time sufficiently soft and plastic to be easily deformed by handling. Another characteristic of the foods with which this invention realizes its greatest advantages is that they are flowable at temperatures which do not impair the quality of the foods, while they become non-flowable upon being cooled to the temperatures at which they are normally used.

This invention is particularly applicable to retail-size packages containing one or more ornamentally molded consumer-size units of soft plastic foods. By the term "retail-size packages" is meant such sizes as are normal for purchase by a consumer in a retail store. For example, the normal retail-size unit for butter and margarine is a one-pound package. For ice cream it may be a pint, quart or gallon. For processed cheese it is usually two pounds or less. By the term "consumer-size units" is meant such sizes as are normally served on a consumer's table. For example, the normal table-size unit or consumer-size unit for butter and margarine is a quarter-pound, and to a lesser extent a half-pound. For cheese, it is usually a half-pound or less. For ice cream it is any unit less than a pint. A great deal of butter and margarine and to a small extent cheese and ice cream is sold in retail-size packages containing a multiple number of smaller table-size units. For example, one-pound packages of margarine frequently contain four quarter-pound units. It is these quarter-pound units that the consumer uses one at a time to place on saucer-size dishes for service on the table. This invention is also concerned with "wholesale-size packages" which generally contain a number of retail-size packages.

The packaging of soft plastic foods in both retail and wholesale-size packages involves difficult problems which heretofore have imposed severe restrictions on the shape and appearance of the packaged foods. The soft plastic nature of these foods make them highly susceptible to shape-deformation and surface-marring during distribution through the channels of trade. This is the reason why nesting shapes have been employed commercially almost exclusively for many soft plastic foods. For example, at present most soft plastic foods, which are intended to be completely unwrapped before being placed on the table, are packaged in table-size units having a square, rectangular, or other shape providing straight edges and flat sides which permit a number of separate food bodies to be nested together in both wholesale- and retail-size units. In this way the shape and merchantable appearance of the soft plastic food bodies can be preserved even though inexpensive, thin-walled containers are employed.

Non-nesting containers, particularly circular containers, are also employed commercially for packaging soft plastic foods. However, in order to protect the packaged food bodies such containers are generally of strong, rigid construction, and therefore are not well adapted for the removal of the entire, intact food body from the package. Furthermore, these containers are not well adapted for the packaging of separate, table-size units within retail-size packages, and this necessitates dipping out or cutting off individual or table-size servings by consumers. Such servings tend to have irregular and unattractive shapes.

The combined result of these commercial practices, which as indicated have been adopted in the interest of low cost packaging of soft plastic foods while at the same time adequately protecting them, is that consumers have not been able to buy most soft plastic foods in table-size units having decorative shapes and ornamented surfaces. The well-known desire of American housewives to set an attractive table has provided a powerful incentive for new developments in the food industry. However, heretofore this desire has not been satisfied in connection with soft plastic foods. In other words, until the present invention no one has succeeded in producing an inexpensive, simple, easily operated and foolproof package, for molding, carrying, and dispensing soft plastic foods in consumer-size units having a wide variety of attractive non-nesting shapes and intricately ornamented surfaces. For example, attempts have been made to sell table-size units of ice cream having ornamental shapes and surfaces to resemble flowers, animals, etc.; but, these shapes had to be molded and packaged completely by hand methods which resulted in costs that were as much as 300% higher than the costs of flat surfaced nesting shaped packages. Until this invention, no method of packaging has been found which could approximate the low costs of the flat surfaced packages and at the same time achieve the desired result of delivering on the consumer's table intact and unmarred a molded unit having ornamental surfaces.

In addition, the present-day methods for packaging soft plastic foods have certain inherent disadvantages which render them inconvenient for the consumer. For example, retail packages of ice cream are practically all packaged in non-table-size units. The consumer is consequently confronted with the problem of how to remove the ice cream from the package and serve it in a neat presentable condition without loss of product. In actual practice the table-size portions sliced or spooned from the retail package are rarely uniform or neat in appearance, and usually some ice cream is wasted which adheres to the crevices and corners of these packages.

With butter and margarine packages the table-size units must be removed from the retail package and unwrapped by hand. This makes it almost impossible to avoid touching the product with the fingers, thereby getting them greasy and the food imprinted with finger marks. Also, the shapes used for butter and margarine today usually do not properly fit the saucers on which they are placed. Instead of fitting into the base of the saucer, they usually extend up onto the saucer side. Consequently, when diners attempt to cut off smaller portions, they have difficulty doing so without tipping the saucer. Moreover, the operation remains a difficult one for the diner until enough of the food has been used so that the remaining portion is small enough to lie wholly and firmly within the base section of the saucer.

It is therefore the general object of this invention to overcome the abovementioned difficulties and limitations of present-day soft plastic food packages. More specifically, it is an object of this invention to provide both a means and a method for delivering in a commercially practical manner to the serving dish of the consumer, intact and unmarred, a decoratively-shaped, surface-ornamented, consumer-size unit of a soft plastic food. Further specific objects and advantages will appear as the specification proceeds.

During the experimental work leading to the present invention, it was found that in order to accomplish the objects stated above it was necessary to provide a method of packaging soft plastic foods and a package for use in carrying out the method which achieves a simultaneous solution to three aspects of the broader problem of marketing soft plastic foods in ornamental shapes. Specifically, it was recognized that not only must provision be made for adequately protecting the surface-ornamented shape during distribution, but also provision must be made for forming the shape at the filling plant and for removing it intact from its container. It is believed that the outstanding feature of the present invention is that it embodies for the first time a commercially feasible solution to all of the interrelated problems of molding, carrying, and dispensing soft plastic foods in decorative and surface-ornamented shapes.

An important conception underlying the present invention relates to the use of a supported pocket formed of thin, flexible film to provide both a mold and a package for soft plastic foods. In experimenting with package structures embodying this conception, I discovered, upon forming a pocket with a generally inward taper from its mouth and supporting the pocket with the portion inwardly of its mouth unconnected to the support, that the soft plastic food body within the pocket conforming to its shape can be separated intact and unmarred by inverting the pocket and peeling it from the food body by progressively reversing the pocket, even if the pocket has impressed an extensive, intricate surface ornamentation on the food body. In developing the preferred commercial embodiment of this invention, I found that even though the food-receiving pocket was flexible enough to be reversible without disfiguring the food body therein, it was not necessary to provide a rigid shape-conforming backing for the pocket. The use of a backing for the food-receiving pocket, while permissible without departing from the generic form of the present invention, is made unnecesary in its preferred embodiment because of the additional discovery that an unbacked, freely-suspended film pocket cooperates with the firmed food body therein to provide a rigid unit which adequately supports and protects the food body during distribution. Moreover, the greater accessibility to the outside and particularly the outer bottom surface of an unbacked pocket has been found to facilitate ejection of the food body from the pocket. Further findings and discoveries will appear as the specification proceeds.

In one of its phases, this invention contemplates the combination in a soft plastic food package of a reversible pocket formed of thin, flexible film and having a generally inward taper from its mouth, means for supporting the pocket with its mouth uppermost, and a soft plastic food within the pocket conforming to its shape. At least the portion of the pocket inwardly of its mouth should be unconnected to the support to permit the pocket to be reversed, whereby the soft plastic food can be separated from the pocket without marring its shape by inverting and progressively reversing the pocket. Preferably, the portion of the pocket adjacent its mouth is fixedly connected to the support and the rest of the pocket is freely carried by the support. Furthermore, in order to realize the maximum advantage of the package structure of this invention, the food-receiving pocket is preferably provided with a non-smooth surface ornamentation, and the food body in the pocket also conforms to and is thereby provided with the same surface ornamentation.

The nature of the foods which can be advantageously packaged by this invention has been indicated above, and it has been pointed out that these foods can be most accurately described as "soft plastic foods." Therefore, it is believed that it will not be necessary at this point to further discuss the food materials with which this invention is concerned.

The nature of the container structures used in connection with the soft plastic foods to form the packages of this invention, however, requires a more extended explanation. The accompanying drawing illustrates one preferred embodiment of the package structure and method of this invention. Therefore, it is believed that reference to the drawing will facilitate explanation of the container and package structures falling within the scope of this invention.

In the accompanying drawing, Fig. 1 is a perspective view of a plurality of packages embodying my invention and united to form a single package; Fig. 2, a vertical sectional view of one of the individual packages of Fig. 1; Fig. 3, a perspective view of the same package shown in inverted position upon a saucer and after removal of the cover; Fig. 4, a perspective view showing the removal of the container while leaving the molded food body upon the saucer; Fig. 5, a view similar to Fig. 3 but showing the container employed as a cover for the food contents remaining after partial consumption thereof; and Fig. 6, a perspective view of a plurality of united packages similar to the packages of Fig. 1, but having a rectangular instead of circular shape.

In the illustration given, 10 designates the perimetric support for the pocket-providing film 11. Support 10 should be relatively rigid compared to film 11, and should have sufficient strength to support the soft plastic food body A within the pocket provided by film 11. Support 10 can be constructed of any suitable material capable of meeting these requirements. For example, it can be formed of laminated paper, molded pulpwood, plastic, cardboard, and a variety of similar materials. Preferably, support 10, as illustrated, extends entirely around the top or mouth 11a of pocket 11b, and also provides an enclosure around the side walls of the pocket. A vertically-extending, open-end, tubular support, as illustrated, has been found particularly advantageous. It will be understood, however, that the term "tubular" is used in its broader sense as including hollow, perimetric supports of all suitable cross-sectional shapes such as circular, oval, square, triangular, rectangular, and hexagonal or other polygonal shapes.

Film 11 can be carried by support 10 in any suitable manner. In the specific illustration given, film 11 is fixedly connected by an adhesive, such as, for example, a rubber adhesive, to the upper edge of tubular support 10. Pocket 11b can be formed in film 11 before or after placing it upon the support. It will be understood, however, that the method adopted will depend on the nature of the material forming film 11. Preferably, pocket 11b is formed of thin, flexible, thermoplastic film. Such films are heat-stretchable and can be readily formed and shaped by a male or female die member to provide pockets or cavities of exactly the desired volume, shape, and surface ornamentation. For example, by attaching a thermoplastic film to a perimetric support and heating it to its thermoplastic temperature range, a male die can be pressed against the heated film to stretch it away from its line of attachment to the support. An even simpler procedure is to apply suction to the outside of a heated thermoplastic film and draw it down into a tubular support against a cold female die member. As it conforms to the face of the die, it will be rapidly cooled and set in a shape corresponding to the shape of the die face. Any desired non-smooth surface ornamentation or figuring can also be impressed on the pocket in this manner. The term "non-smooth" is intended to include both raised and indented surface ornamentations. However, it will be apparent that with thin films of the type dealt with herein, it is a matter of choice as to whether the indented or raised portions of the film surface are regarded as providing the design. Probably, it is somewhat more logical to regard all non-smooth designs as indented when the pockets are die-formed from thermoplastic film.

As seen more clearly in Fig. 2, film 11 is secured to tubular support 10 around the top or mouth 11a of pocket 11b. It will also be noted that pocket 11b has a generally inward taper from its mouth, or more specifically, as illustrated, pocket 11b is provided with downwardly and inwardly tapering walls. Thus, the greatest cross-sectional area of pocket 11b is adjacent to its mouth 11a, and the pocket itself is suspended from tubular support 10 with its walls at a spaced distance from the walls of the support. It will also be noted that pocket 11b gradually decreases in cross-sectional area from top to bottom. This construction permits the pocket to be reversed or turned inside out when a thin, flexible film is employed to form the pocket. This reversing action, as indicated above, has been found to be of great importance in ejecting the food body carried in the pocket. Therefore, it will be understood that pocket 11b is intended to be reversible. Preferably, pocket 11b is unbacked, as illustrated, since this construction has also been found to facilitate the ejection of the food body from the pocket, while the food body is adequately supported by an unbacked film pocket. However, backed film pockets can also be employed if desired.

The film pocket can be smooth-walled, but preferably it is provided with a non-smooth surface ornamentation, which can be impressed on the surface of the food body to enhance its eye-appeal. For example, pocket 11b is illustrated as having tapered, arcuate flutes with an offset or ridge in between the upper and lower portion of the flutes. It will be understood that the design shown is merely illustrative of the multitude of designs which can be impressed on the walls of the food-receiving pockets for the purpose of correspondingly molding the soft plastic food bodies within the pockets.

Any thin, flexible thermoplastic film can be employed to form the reversible, food-receiving pockets. For example, among other well-known thermoplastic films, the following can be used: rubber hydrochloride films, polyethylene films, vinyl chloride-acetate copolymer films, vinylidene chloride films, ethylene glycol terephthalate films, polyamide films, cellulose acetate films, cellulose propionate films, cellulose butyrate films, etc. Best results are obtained when the walls of the thermoplastic film pockets are fold-free and crease-free while having a non-smooth surface ornamentation impressed thereon.

Film pockets having the desired characteristics for the purposes of this invention will ordinarily have thin walls ranging in thickness from .003 inch to .0005 inch. With most thermoplastic films best results are obtained when the thickest portions of the walls of the film pockets are less than .0025 inch in thickness. In fact, the thinnest portions of the walls of preformed thermoplastic film pockets of the kind dealt with herein are frequently only about .0005 inch thick. For example, a .001 inch thick film when stretch-drawn into a hemispherical, 2-inch deep pocket will usually reduce at its bottom to about .0005 inch in thickness.

While thermoplastic films are generally quite satisfactory for use in this invention, certain thermoplastic films give somewhat better results than others for producing molded shapes of soft plastic foods having sharply-defined surface ornamentations. This is due to the fact that thin gauges of certain thermoplastic films, while highly flexible, at the same time possess considerable resilience and sufficient stiffness to be entirely shape-maintaining under the weight of the food body within the pocket. The combination of these physical properties, as indicated above, has been found to be especially important in connection with the molding, carrying, and dispensing of soft plastic food bodies having sharply-defined surface ornamentations. Among the thermoplastic films which best display this balance of physical properties can be listed: vinyl chloride-acetate copolymer films, ethylene glycol terephthalate films, and cellulose acetate, propionate, and butyrate films. These films upon being die-formed into reversible pockets of less than .002 inch in thickness, have been found to accept from the die and to maintain under the weight of the food bodies non-smooth surface ornamentations substantially as sharply defined as the ornamentations on the dies used to form the pockets. At the same time, these pockets have been found to be readily reversible while remaining intact and connected to their supports, and without disfiguring the ejected food bodies. Specific preferred thermoplastic films are: (1) unplasticized vinyl chloride-acetate copolymer films, such as the film formed from a vinyl chloride-acetate resin material containing around 3% vinyl acetate, and (2) unoriented ethylene glycol terephthalate films are particularly desirable for use in packaging ice cream, since such pockets remain highly flexible and therefore non-shattering at temperatures down to minus 60° C. This permits ice cream, when packaged in accordance with this invention, to be taken directly from sub-zero storage and dispensed without delay.

In addition to thermoplastic film, other types of material can be used to form the reversible film pockets with more or less success. For example, thin, flexible sheeting material such as certain treated parchment papers and cellulose products having pockets molded or otherwise formed therein can be used. Metal foils such as aluminum foil can also be listed as materials of the type which could be used in the present invention. However, I prefer to employ thermoplastic films because of the ease with which surface-ornamented pockets can be formed in such films, and also because of the greater strength of the thermoplastic film pockets.

Any suitable type of covers can be provided for the mouths of the film pockets after the pockets have been filled with the soft plastic food, or if desired covers can be omitted.

In the illustration given, a thermoplastic cover 12 is secured by heat-sealing to the top edge of the thermoplastic film 11 and the cover 12 is preferably provided with a depending tab 13 which facilitates the removal of the cover 12.

The film 11 may be secured to the outer wall of the tube 10 and allowed to extend over the edge of the tube and into the interior or, if desired, the film may be secured to and suspended from the inner wall of the tube 10.

As illustrated in Fig. 1, a plurality of the containers 10 may be stacked one upon the other and the containers thus formed may be united into a single package by a gummed tape strip 14, or by the use of a plurality of such strips.

If desired, the tape may be extended in a horizontal line to cover the adjacent edges of two containers, and such tape is illustrated by the numeral 15 in Fig. 6. In Fig. 6, rectangularly-shaped tubes 16 are employed and the plastic foods are suspended therein in the same manner as described in connection with the structure shown in Figs. 1 to 5. However, the tape strips 15, instead of being extended vertically along the sides of the containers, are extended around the cartons in a horizontal plane to secure the adjacent edges of the containers.

Method of operation

It will be apparent from the foregoing that not only is this invention concerned with a soft plastic food package, but also with a method of molding, carrying, and dispensing soft plastic foods. In the method aspect of this invention the package structure previously described in detail provides the means for carrying out the novel method of molding, carrying, and dispensing soft plastic foods.

In the carrying out of the invention, a tapered film pocket is suspended from a support to provide a container of the type illustrated in the drawing. Preferably, the suspended film pocket is provided with a non-smooth surface ornamentation. The suspended film pocket thus provides a mold for forming the soft plastic food. The food material is introduced into the mold pocket, preferably in fluid condition, and maintained in fluid condition in the pocket until it conforms to the shape and surface ornamentation thereof. The food material is then firmed within the pocket by cooling the food material while it conforms to the shape and surface ornamentation of the walls of the pocket and clings thereto. Alternatively, the pocket can first be filled, and then the pocket with the firmed food material therein can be suspended upon a support to form the package unit.

To facilitate shipment, a cover will usually be secured across the open top of the filled pocket; however, it will be understood that, under certain conditions, the cover can be omitted, as, for example, when the bottom of one package is arranged to form a seal with the package below. Ordinarily, however, I prefer to have a cover for each container to provide a seal therefor so that there is no danger of contamination of the food by odors from other foods in the refrigerator, and so that there is no danger of the food spilling out if it becomes fluid.

It will be understood that in actual filling room operations, a plurality of containers will be filled at one time. Generally the film pocket will be filled substantially full and in such a manner that the upper surface of the food material in the pocket forms a flat base adjacent the mouth of the pocket. The preferred appearance of the food body in the pocket is illustrated in Fig. 2 of the drawing. The individual package can be formed into larger units for shipping and retail sale in a number of different ways. Two convenient methods are illustrated respectively in Figs. 1 and 6 of the drawing.

Assuming that a consumer has purchased a package such as is illustrated in Fig. 1, and it is desired to remove the contents of one of the containers, the tape 14 is peeled downwardly from the top, as indicated in dotted lines in Fig. 1, and the uppermost container is thus free for removal. The pull tab 13 of the uppermost container is drawn so as to remove the cover 12. A saucer or dish 17 (or other object providing a flat surface) can be placed over the tube 10 and then inverted to the position shown in Fig. 3. The tube 10 can then be raised, as illustrated in Fig. 4, thus progressively reversing the flexible film 11, while leaving the surface-ornamentation of the plastic food unmarred.

It will be understood that for many foods where it is rather difficult to separate the food from the film the tube 10 can be moved directly to the position shown in Fig. 3 and then raised so as to separate the film from the plastic food by peeling first from one side and then from another. The flexible character of the film 11 is highly effective in bringing about a clean and relatively easy separation of the film from the molded product without marring the delicate lines thereof. If desired, the support 10 can be grasped with one hand and the fingers of the other hand can be used to apply a light pressure to the bottom of pocket 11b, while the support is being lifted in the manner illustrated in Fig. 4.

After the molded product has been served at the meal and a portion thereof consumed, the remaining portion may be covered with the film 11 and the tube 10 which forms a support therefor, as illustrated in Fig. 5. After the food is entirely consumed, the tube 10 may be thrown away. With this structure it will be observed that it is unnecessary to keep in the refrigerator a large container which is partially empty because each of the individual containers 10 may be thrown away after the food therein is removed and only the remaining filled containers need be kept in the refrigerator.

It is interesting to note that in the removal of the molded food, the turning of the flexible film inside out is accomplished primarily by the clinging of the food itself to the flexible film. In other words, the food itself is the means for progressively reversing the film because of the tendency of the food to cling to the walls of the film pocket, and the release of the food from the pocket is accomplished by a peeling action which avoids the tearing of chunks of the food from the molded body. The film peels evenly as it releases the food and the smooth, clean mold lines in the product are preserved. It will also be noted that the ejecting operation is carried out by moving the support relative to the food body in the direction of taper of the pocket, and at the same time progressively reversing the pocket while maintaining the support at a spaced distance from the unreversed portion of the pocket. In other words, the reversed portion of the pocket serves as a protective flexing member for applying a distributed lifting force to the unreversed portion of the pocket, thereby keeping the support from contacting the unreversed portion of the pocket and facilitating a smooth, non-marring peeling action.

The tubular structure, in the specific illustration given, provides a sturdy support for suspending the contents within the hollow part of the tube while at the same time the walls of the tube, together with the walls of the other tubes in the package, furnish complete structural support for the entire package. At the same time, the molded food products are suspended in free air space within the interior of the tubes so that nothing can touch or deform their delicate shapes. The compartment walls thus fulfill a triple purpose in that they (1) act as a hollow tubular support for each liner or film, permitting the figured part of the film and the contents to swing in free air, (2) provide the sole support for all inside and outside weights that bear upon the package, and (3) serve as the carton section of the package, permitting the selective removal of the food contents of one portion of the package. Each packed food portion can serve as a complete retail unit in itself, or it can be combined with other units to form a multiple unit package. Furthermore, even if the the food material within the package becomes fluid or semi-fluid during distribution through the channels of trade, or while being taken home by the consumer, the appearance of the food body therein will not be permanently damaged. The softened material within the mold pocket need only be cooled to firm the food body and thereby again mold it to its pocket-conforming shape.

The tubular structure further gives each individual compartment a complete and distinct package identity of its own which enables it to be handled and used without affecting or spoiling the usefulness of the other compartments. As the contents of the individual compartments are consumed, the retail-size package diminishes and completely loses its identity as the last compartment is withdrawn.

The ejection of the contents is accomplished with ease and accuracy. One compartment or container may be held in one hand and the contents aligned very accurately in the center of the receiving dish; or the dish may be inverted over a single container and the two turned over together with the container centered with respect to the dish. Should the contents stick to the liner, the open bottom of the tube provides access so that the contents may be pushed free by hand pressure in the turning of the liner inside out.

While in the foregoing specification, I have set out specific preferred embodiments of the package structure and method of this invention in considerable detail, it will be apparent to those skilled in the art that many of the specific details set forth can be varied widely without departing from the spirit of my invention.

I claim:

1. In a soft plastic food package, the combination comprising a thin, flexible film providing a reversible pocket having inwardly and downwardly-tapering walls, a relatively rigid support disposed about said pocket, said pocket being suspended from said support to permit said pocket to be reversed, and a soft plastic food within said pocket conforming to its shape and clinging to the walls thereof, whereby said food can be separated from said pocket without marring its molded shape by inverting and progressively reversing said pocket.

2. In a soft plastic food package for marketing said food in a molded, surface-ornamented body, the combination comprising a thin, flexible film providing a reversible pocket having downwardly and inwardly-tapering walls, said walls having a non-smooth surface ornamentation, a relatively rigid support disposed about said pocket, said pocket being suspended from said support to permit said pocket to be reversed, and a soft plastic food body within said pocket conforming to the shape and surface ornamentation of said pocket and clinging to its walls, whereby said food body can be separated from said pocket without marring its shape and surface ornamentation by inverting and progressively reversing said pocket.

3. In a soft plastic food package, the combination comprising a reversible pocket formed of thin, flexible film and having a generally inward taper from its mouth, a support for said pocket, said pocket being carried by said support with its mouth uppermost and the portion of said pocket inwardly of its mouth being unconnected to said support to permit said pocket to be reversed, and a soft plastic food within said pocket conforming to the shape thereof, whereby said food can be separated from said pocket without marring its shape by inverting and progressively reversing said pocket.

4. In a soft plastic food package adapted to mold, carry, and dispense said food in the form of a surface-ornamented body, the combination comprising a reversible pocket formed of thin, flexible thermoplastic film, said pocket providing a non-smooth surface ornamentation and having a generally inward taper from its mouth, a support for said pocket, said pocket being carried by said support with its mouth uppermost and the portion of said pocket inwardly of its mouth being unconnected to said support to permit said pocket to be reversed, and a soft plastic food body within said pocket conforming to the shape and surface ornamentation thereof, whereby said soft food body can be separated from said pocket without marring its shape and surface ornamentation by inverting and progressively reversing said pocket.

5. In a soft plastic food package for marketing said food in a molded, surface-ornamented body, the combination comprising a thin, flexible, thermoplastic film providing a reversible pocket having walls tapering downwardly and inwardly from its mouth, said walls being fold-free and crease-free while having a non-smooth surface ornamentation impressed thereon, a support disposed about said pocket, said pocket being carried by said support with its mouth uppermost, the portion of said pocket adjacent its mouth resting on said support and the rest of said pocket being unconnected to said support, thereby permitting said pocket to be reversed, and a soft plastic food body within said pocket conforming to the shape and surface ornamentation of said pocket and clinging to its walls, whereby said food body can be separated from said pocket without marring its shape and surface ornamentation by inverting and progressively reversing said pocket.

6. In a soft plastic food package adapted to mold, carry, and dispense said food in the form of a surface-ornamented body, the combination comprising a reversible pocket formed of thin, flexible thermoplastic film, said pocket providing a non-smooth surface ornamentation and having a generally inward taper from its mouth, a perimetric support carrying said pocket with its mouth uppermost, said pocket having only the portion thereof adjacent its mouth fixedly connected to said support means to permit said pocket to be reversed, and a soft plastic food body within said pocket conforming to the shape and surface ornamentation of said pocket and clinging to its walls, whereby said soft body can be separated from said pocket without marring its shape and surface ornamentation by inverting and progressively reversing said pocket.

7. In a soft plastic food package for marketing said food in a molded, surface-ornamented body, the combination comprising a thin, flexible thermoplastic film providing a reversible, downwardly-hanging pocket, said pocket gradually decreasing in horizontal cross-sectional area from top to bottom and having a non-smooth surface ornamentation impressed on the walls thereof, a relatively rigid support disposed about said pocket and connected to the top thereof, said pocket being freely suspended from said support and at least the bottom portion of said pocket being unbacked, thereby permitting said pocket to be reversed, and a soft plastic food body within said pocket conforming exactly to the shape and surface ornamentation of the walls of said pocket and clinging thereto, whereby said food body can be separated from said pocket without marring its shape and surface ornamentation by inverting said pocket and peeling it off of said food body.

8. In a soft plastic food package for marketing said food in a molded, surface-ornamented body, the combination comprising a reversible, downwardly-tapering pocket with its greatest cross-sectional area at its top formed of thin, flexible, thermoplastic film and having an indented surface ornamentation, a relatively rigid support disposed about said pocket and connected to the top thereof, said pocket being unbacked and freely suspended from said support to permit said pocket to be reversed, and a soft plastic food body within said pocket conforming exactly to the shape and surface ornamentation of said pocket and clinging thereto, said food body having a flat upper surface adjacent the top of said pocket, whereby said food body can be ejected from said pocket without marring its shape and surface ornamentation by holding said pocket with the flat surface of said food body downwardmost and then progressively reversing said pocket.

9. A soft plastic food package, comprising a perimetric support, a flexible thermoplastic film secured to said support and providing a pocket having inwardly and downwardly-tapering walls, the walls of said pocket being spaced from said support, a molded soft plastic food body in said pocket conforming to the shape thereof and having a substantially flat upper surface, the walls of said pocket being preformed to provide a non-smooth surface ornamentation, said food clinging to the flexible walls of said pocket to temporarily stiffen said walls, whereby said pocket and body are suspended as a relatively immovable unit within said support and out of contact with the walls thereof, and a flat cover extending over the flat top surface of said molded body, said pocket being reversible after the removal of said cover to peel said pocket off of said molded food body.

10. A package for soft plastic foods, comprising a relatively rigid, hollow support, a thin, flexible, thermoplastic film carried by said support and providing a food-receiving pocket having its top connected to said support and the rest of said pocket hanging downwardly within said support at a spaced distance from the walls of said support, the walls of said pocket having a maximum thickness of less than about .003 inch and being provided with an indented surface ornamentation, a molded soft plastic food body in said pocket conforming to the shape and surface ornamentation of said pocket and clinging to its walls, said food body having a substantially flat, upper surface adjacent the top of said pocket, and a flat cover extending across the top of said pocket adjacent the flat upper surface of said food body, said pocket being reversible after the removal of said cover to peel said pocket off of said molded food body.

11. A soft plastic food package, comprising a relatively rigid, hollow support, a thin, flexible, thermoplastic film secured to said support and providing an inwardly-tapering pocket which is non-stretchable under the weight of its food contents, a molded soft plastic food body in said pocket conforming to the shape thereof and having a flat top surface, said pocket suspending said molded food within said hollow support and out of contact with the walls thereof, and a film sealed to said first-mentioned film and providing a flat cover over the flat top surface of said molded food, said pocket-forming film being reversible, after the removal of said cover, to peel said pocket from said molded body.

12. In a soft plastic food package for marketing said food in a molded, surface-ornamented body, the combination comprising a vertically-extending, open-ended, perimetric support, a reversible, tapered pocket formed of thin, flexible, thermoplastic film and having a non-smooth surface ornamentation, said pocket being freely suspended from the upper end of said perimetric support and hanging downwardly within said support but out of contact therewith, and a soft plastic food body within said pocket conforming to the shape and surface ornamentation thereof and clinging to said pocket, whereby said food body can be separated from said pocket without marring the shape and surface ornamentation thereof by inverting said pocket and peeling it off of said food body by progressively reversing said pocket.

13. In a soft plastic food package adapted to mold, carry, and dispense said food in the form of a surface-ornamented body, the combination comprising a vertically-extending, open-ended, tubular support, a reversible pocket formed of thin, flexible, thermoplastic film and tapering generally inwardly and downwardly from its top, said pocket being connected at its top to the upper end of said tubular support and the rest of said pocket hanging downwardly within said support at a spaced distance therefrom, and a soft plastic food body within said pocket conforming to the shape thereof and having a flat upper surface adjacent the top of said pocket, both said pocket and said food body having corresponding surface ornamentations.

14. In a soft plastic food package for marketing said food in a molded, surface-ornamented body, said package being characterized by its ability to maintain the shape and surface ornamentation of said food body during distribution while thereafter permitting said body to be easily removed from said package without marring the shape and surface ornamentation thereof, the combination comprising a downwardly-tapering pocket formed of thin, flexible, thermoplastic film having a sharply-defined, non-smooth, surface ornamentation, a relatively rigid support disposed about said pocket and connected to the top thereof, said pocket being suspended from said support and being reversible while remaining intact and connected to said support, and a soft plastic food body within said pocket conforming to the shape and sharply-defined surface ornamentation thereof and clinging to said pocket.

15. The combination of claim 14 in which said thermoplastic film consists of an unplasticized vinyl chloride-acetate copolymer film.

16. The combination of claim 14 in which said thermoplastic film consists of ethylene glycol terephthalate film.

17. In a soft plastic food package for marketing said food in a molded, surface-ornamented body, said package being characterized by its ability to maintain the shape and surface ornamentation of said food body during distribution while thereafter permitting said body to be easily removed from said package without marring the shape and surface ornamentation thereof, the combination comprising a downwardly-tapering pocket with its greatest cross-sectional area at its top formed of flexible, thermoplastic film, the film walls of said pocket being less than .003 inch thick, a support disposed about said pocket and connected to the top thereof to suspend said pocket with the lower portion thereof in spaced-apart relation from said support, and a soft plastic food body within said pocket conforming to the shape thereof and clinging to said pocket, both said pocket and said food body having mating, sharply-defined, indented surface ornamentations, and said pocket being reversible while remaining intact and connected to said support without disfiguring the surface of said food body.

18. In a process for molding and packaging a soft plastic food, the steps of introducing a soft plastic food in fluid condition into a reversible pocket formed of thin, flexible film and having downwardly and inwardly-tapering walls, firming said food while it conforms to the shape of the walls and clings thereto while also suspending the pocket upon a support with the side walls thereof spaced from the support, and thereafter ejecting the molded food body by moving said support relative to said food body in the direction of taper of said pocket and at the same time progressively reversing said pocket while maintaining said support at a spaced distance from the unreversed portion of said pocket.

19. In a process for molding and packaging a surface-ornamented soft plastic food body, the steps of introducing a soft plastic food in fluid condition into a reversible pocket formed of thin, flexible, thermoplastic film and having downwardly and inwardly-tapering walls provided with a non-smooth surface ornamentation, firming said food while it conforms to the ornamented shape of the walls and clings thereto while also suspending the pocket upon a support with the side walls thereof spaced from the support, and thereafter ejecting the molded, surface-ornamented food body by moving said support relative to said food body in the direction of taper of said pocket and at the same time progressively reversing said pocket while maintaining said support at a spaced distance from the unreversed portion of said pocket.

20. In a process for molding and packaging a soft plastic food, the steps of introducing a soft plastic food in fluid condition into a reversible pocket formed of flexible film and having downwardly and inwardly-tapering walls, while at the same time suspending said pocket upon a support and spacing the walls of said pocket from said support firming the food in said pocket while it conforms to the shape of the walls and clings thereto, and with the top surface of the firmed food body forming a substantially flat base, whereby upon inverting the pocket, said flat base can be brought upon a receptacle as the pocket is peeled from said firmed food body.

21. In a packaging process wherein a soft plastic food is formed into a tapered shape, the steps of molding a soft plastic food in a reversible, supported tapered pocket formed of thin, flexible, thermoplastic film by introducing said food into said pocket and maintaining said food in fluid condition therein until it conforms to the shape of said pocket, thereafter firming the food body within said pocket to produce a substantial cling between the contacting surfaces of said food body and said pocket, and then peeling said pocket from said firmed food body by moving said pocket relative to said food body while progressively reversing said pocket, whereby said food body can be separated from said pocket without marring its shape.

22. In a packaging process wherein a soft plastic food is formed into a surface-ornamented body, the steps of molding a soft plastic food in a reversible, supported tapered pocket formed of thin, flexible, thermoplastic film having a non-smooth surface ornamentation by introducing said food into said pocket and maintaining said food therein in a fluid condition until it conforms to the shape and surface ornamentation of said pocket, thereafter firming the food within said pocket while it conforms to the shape and surface ornamentation of said pocket and clings thereto, and then peeling said pocket from said firmed food body by moving said pocket relative to said food body while progressively reversing said pocket, whereby said food body can be separated from said pocket without marring the shape and surface ornamentation of said food body.

23. In a packaging process wherein a soft plastic food is formed into a molded, surface-ornamented body, the steps of attaching the top of a reversible, downwardly-tapering pocket formed of thin, flexible, thermoplastic film having a non-smooth surface ornamentation to a relatively rigid member extending around said pocket and lying at a spaced distance from the rest of said pocket, molding a soft plastic food in said pocket by introducing said food into said pocket and maintaining said food therein in fluid condition until it conforms to the shape and surface ornamentation of said pocket, thereafter firming the food within said pocket while it conforms to the shape and surface ornamentation of said pocket and clings thereto, and then peeling said pocket from the firmed food body by inverting said pocket and applying a lifting force to said support to progressively reverse said pocket.

24. In a packaging process wherein a soft plastic food is formed into a molded, surface-ornamented body, the steps of suspending a reversible, downwardly-tapering pocket from a support, said pocket being formed of thin, flexible, thermoplastic film, and having a sharply-defined indented surface ornamentation, introducing a soft plastic food into said pocket in fluid condition so that it conforms to the shape and surface ornamentation thereof and forms a generally flat upper surface adjacent the top of said pocket, thereafter firming the food body within said pocket to produce a substantial cling between the contacting surfaces of said food body and said pocket, and then peeling said pocket from said food body by first inverting said pocket and then moving said pocket upwardly relative to said food body with the flat surface of said food body resting on a generally flat, horizontal surface, whereby said food body can be separated from said pocket and deposited on a flat, horizontal surface without marring the shape and surface ornamentation of said food body.

25. In a packaging process wherein a soft plastic food is formed into a molded, surface-ornamented body, the steps of attaching the top of a reversible, downwardly-tapering pocket formed of thin, flexible, thermoplastic film having an indented surface ornamentation to a support disposed about said pocket, flowing a soft plastic food into said pocket to mold a food body therein conforming on its sides and bottom to the shape and surface ornamentation of said pocket and having a generally flat top adjacent the top of said pocket, thereafter firming the food body within said pocket to produce a substantial cling between the contacting surfaces of said food body and said pocket, and then peeling said pocket from said firmed food body by inverting said pocket and then moving said pocket upwardly relative to said food body with the flat surface of said food body held in close proximity to a generally flat, horizontal surface, whereby said food body can be separated from said pocket without marring the shape and ornamentation of said food body by progressively reversing said pocket.

LEO PETERS.

REFERENCES CITED

The following references are of record in the file of this patent:

UNITED STATES PATENTS

| Number | Name | Date |
|---|---|---|
| 1,411,223 | Retzbach | Mar. 28, 1922 |
| 2,019,552 | Watts | Nov. 5, 1935 |
| 2,045,730 | Schepman et al. | June 30, 1936 |
| 2,086,887 | Wilcox | July 13, 1937 |
| 2,134,908 | Copeman | Nov. 1, 1938 |
| 2,317,067 | Knaust | Apr. 20, 1943 |
| 2,402,943 | Bogoslowsky | July 2, 1946 |
| 2,438,089 | Carson | Mar. 16, 1948 |
| 2,501,570 | Larsen | Mar. 21, 1950 |
| 2,511,481 | Schneider | June 13, 1950 |